June 5, 1962 R. J. HOLTON 3,037,729
FASTENING DEVICES

Original Filed June 16, 1958 2 Sheets-Sheet 1

INVENTOR.
ROBERT J. HOLTON
BY
Teare & Felzer
ATTORNEYS

June 5, 1962    R. J. HOLTON    3,037,729
FASTENING DEVICES
Original Filed June 16, 1958    2 Sheets-Sheet 2
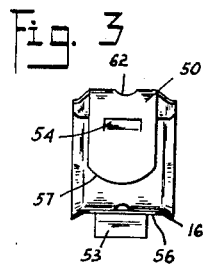
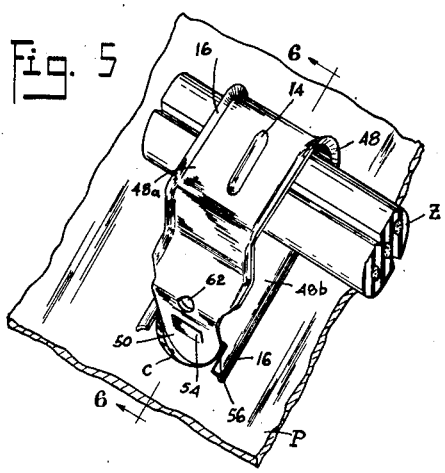
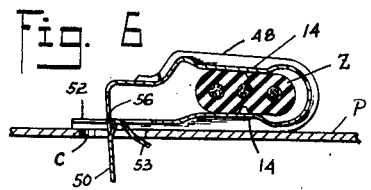
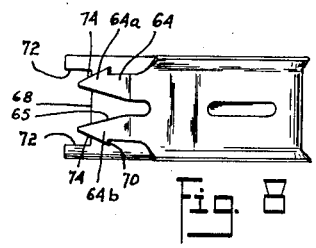
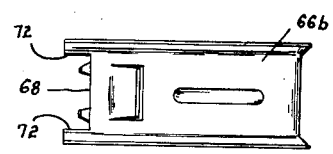
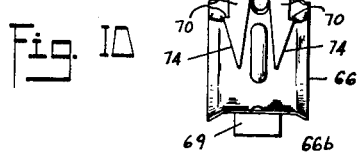
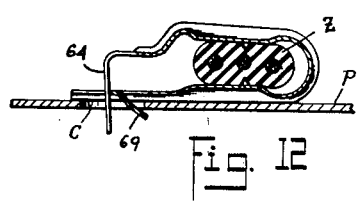
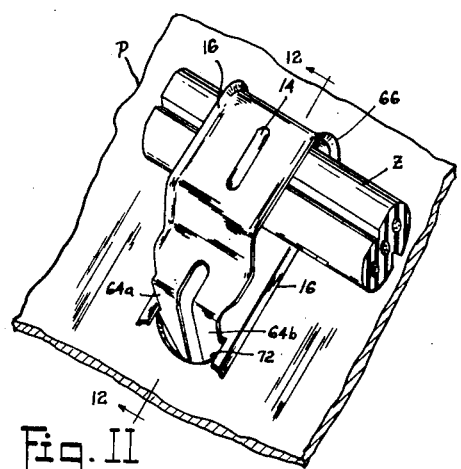
INVENTOR.
ROBERT J. HOLTON
BY
Teare & Felzer
ATTORNEYS

United States Patent Office 3,037,729
Patented June 5, 1962

3,037,729
FASTENING DEVICES
Robert J. Holton, Cleveland, Ohio, assignor to Tinnerman Products, Inc., Cleveland, Ohio, a corporation of Ohio
Original application June 16, 1958, Ser. No. 742,105, now Patent No. 2,996,275, dated Aug. 15, 1961. Divided and this application Mar. 3, 1961, Ser. No. 93,239
7 Claims. (Cl. 248—71)

This invention relates to fastener means for mounting cables, conduits, electrical conductors, tube lines, rods and like objects in place and in stress-relieved relation, upon a support, such as a panel. This is a divisional application of the pending United States patent application of Robert J. Holton, Serial No. 742,105, filed June 16, 1958, and issued August 15, 1961 as Patent No. 2,996,275.

More particularly the invention is directed to spring clip devices constructed from relatively thin material of sheet or strip form, such as sheet spring steel, sheet metal, cold rolled metal, and designed for use in combination with conduits, cables and like objects, for positively mounting the same in applied position on a support without danger of loosening or accidental removal, incident to vibration, jarring and strain which may take place in the supporting member. The fastener or clip also provides means for readily and quickly detaching the clip from assembled relation with the supporting panel when the latter becomes desirable or necessary.

A specific illustration of the use to which the clip devices of this invention may be put is the mounting of conduits, cables and the like as employed in electrical appliance wiring. In mounting such wiring, it is desirable that the clips be capable of being easily and quickly applied in firm engagement in applied position on the supporting part or frame, and yet may be relatively easily removed from such supporting position when so desired.

In the instant arrangement, the clip comprises a contractable, resilient-like body portion for receiving and holding in stress relieving relation the cable, conduit, tube or other like object, and a shank or bayonet portion depending from the body portion and adapted to be received in substantially snap fastening relation in an aperture in the supporting part, for clamping the clip to the associated conduit and in mounted position on the supporting panel.

This invention therefore contemplates the provision of a relatively inexpensive clip device which may be manufactured from sheet or strip metal having spring-like characteristics, and is adapted for mounting cables, conduits and the like on an apertured supporting wall or panel.

Another object of the invention is to provide fastening means for mounting cables and the like, and embodied in the form of clip devices having relatively yieldable shank or bayonet portions and including holding means on the shank portion for snap fastening relation, for readily mounting the clip and the associated cable or like object on a supporting part and for firmly clamping the cable in mounted position on the supporting part.

Another object of the invention is to provide fastening means of the latter type which includes means for quickly and easily detaching the clip device from secured relation on the supporting part.

A further object of the invention is to provide clip means by which a tube line, electrical line or like object can be easily and quickly mounted on a support, and which will hold the object positively in applied position on the supporting part.

A more specific object of the invention is to provide a fastening device comprising a resilient, contractable loop-like body or wire harness portion for receiving a conduit, tube or like object therein and embodying means for positively clamping the conduit or tube in secured relation, and including a yieldable shank portion depending from the body portion and being adapted to be received through an aperture in the supporting part or panel, said shank portion including holding means thereon adapted for snap-fastening relation with the clip proper, for holding the cable, conduit or other object being mounted in positive applied position on the supporting part.

Other features and advantages of the invention will be apparent from a consideration of the following description taken in conjunction with the accompanying drawings wherein:

FIG. 3 is an end elevational view taken from the left-hand side of FIG. 1.

FIG. 5 is a perspective view showing the clip device in applied position on a supporting part or panel and mounting an electrical conduit thereon.

FIG. 6 is a vertical sectional view taken generally along the plane of line 6—6 of FIG. 5, looking in the direction of the arrows.

FIG. 7 is an enlarged side elevational view illustrating a modification of the invention.

FIG. 8 is a top plan view of the clip of FIG. 7.

FIG. 9 is a bottom plan view of the clip device of FIG. 7.

FIG. 10 is an end elevational view taken from the left-hand side of FIG. 7.

FIG. 11 is a perspective view showing the clip device of FIG. 7 in applied position on a supporting part or panel, and mounting an electrical conduit thereon.

FIG. 12 is a vertical sectional view taken generally along the plane of line 12—12 of FIG. 11 and looking in the direction of the arrows.

Figure 1:
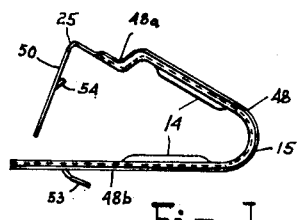
FIG. 1 is an enlarged, side elevational view of one embodiment of the clip device of the invention.
Figure 2:
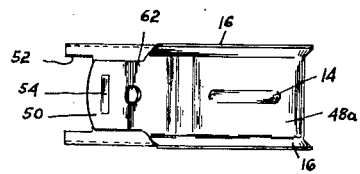
FIG. 2 is a top plan view of the clip of FIG. 1.
Figure 4:
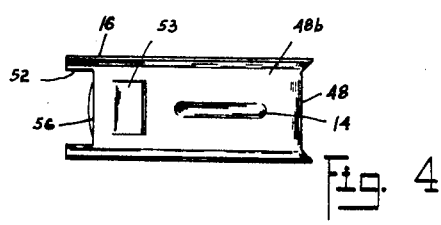
FIG. 4 is a bottom plan view of the clip device of FIG. 1.

Referring again to the drawings and in particular to FIGS. 1 to 6 thereof, in carrying out the invention, the securing devices or clips may be formed from a strip section or stamped blank of metal sheet materials such as spring steel, cold rolled metal, sheet metal and the like. The strip or blank of spring or resilient metal may be reversely bent, as shown, to provide a generally open-ended, somewhat elongated, loop-like body portion 48 which is adapted to receive therethrough the cable, conduit, tubing or other object to be mounted. The upper section 48a of the body portion provides a lever portion, and at its outer or left-hand end (as viewed in FIG. 1) is of reduced width and defines a generally depending shank or bayonet portion 50, for a purpose to be hereinafter described. The lower section 48b of the loop provides a base portion which is adapted to be mounted in generally abutting relation with a supporting wall or panel P (FIG. 5). Body portion 48 has inwardly extending bosses or projections 14 formed therein generally adjacent return bend portion 15, for positively gripping and clamping the associated cable, tubing or the like in the assembled position of the clip on the panel P. In the free or non-assembled condition of the clip, as shown in FIG. 1, body sections 48a and 48b thereof generally diverge with respect to one another and the free end of shank portion 50 is disposed in spaced relation to base section 48b. The side edges of the body sections 48a and 48b are generally turned or bent outwardly from the plane of the respective section, as at 16, to provide strength and increase the spring or resilient characteristics of the body portion 48 and thus increase its resistance to contraction.

Shank portion 50 may be partially severed intermediate its ends to provide an inwardly and upwardly extending tab or detent element 54 for a purpose hereinafter described. The free end of base section 48b is provided with a recessed portion 52 through which the shank portion 50 is adapted to move upon securing the clip onto a panel, as will be hereinafter described. Section 48b, inwardly of recessed portion 52, may be provided with a partially severed portion which defines a downwardly and rearwardly extending tongue or tab 53, for retaining the device on a supporting panel. An opening or hole 62 may be provided through section 48a of the clip, generally at the juncture 25 of the shank portion 50 with the body portion 48, for a purpose to be hereinafter described.

The clip device is secured to a panel by slipping the tongue portion 53 into overlapping relation with a defining edge of an opening C in the panel, and then squeezing or forcing the body section 48a toward section 48b, thereby moving shank 50 through recessed portion 52 in the base section 48b of the clip, and through underlying opening C in the panel until overlapping snap fastening engagement occurs between detent 54 and the transverse linear edge 56 of recessed portion 52, and as can be best seen from FIG. 6 of the drawings. Movement of shank 50 through opening C is facilitated by the arcuate configuration, as at 57, of the leading end of the shank. It will be noted that in the embodiment shown, the juncture 25 of the shank portion 50 with the remainder of the clip body is disposed generally inwardly or rearwardly of the leading edge of the abutment 56 on the clip base portion 48b, when the clip is in untensioned condition (FIG. 1), and the direction of extension of shank 50 is such to insure camming engagement of the inner surface of the tab or detent 54 with such leading edge and subsequent snap fastening holding coaction between the tab and the abutment 56. In the closed mounted position of the clip on the panel, the clip is in the form of a closed loop, and depending upon the diameter or size of wire being mounted, the projecting portions 14 of the loop body may engage in clamped relation the wire conduit Z. In any event, the clip, in the latter position, is secured in encircling or clamped relation to the wire and is securely fastened to the panel.

Lengthwise movement of the clip on the panel in one direction as well as outward movement of the clip from the panel is prevented by the depending tongue 53 disposed in overlapped engagement with a peripheral edge of opening C, while lengthwise movement of the clip in the opposite direction is prevented by the engagement of shank portion 50 with defining surfaces of opening C in the panel. The tensioned engagement of the tab 54 with the edge 56 of recess 52 in the body portion of the clip, maintains the loop portion in clamped or contracted relation about the wire Z.

Figure 13:
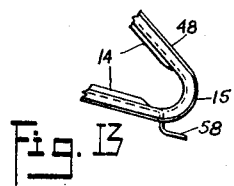
FIG. 13 is a fragmentary, side elevational view of the end portion of the loop section of a modification of the clips and illustrating more particularly a tab structure struck from such portion and adapted to be received in a complementary opening in the supporting part or panel, for rigidly and positively locking the clip device in place on the supporting part or panel.
Figure 14:
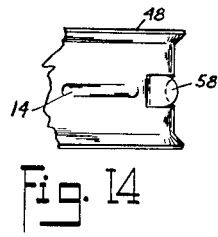
FIG. 14 is a bottom plan view of FIG. 13.
Figure 15:
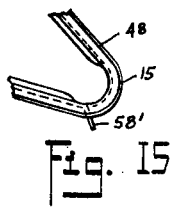
FIGS. 15 and 16 are fragmentary, side elevational views illustrating a modification of the structure shown in FIGS. 13 and 14.
Figure 16:
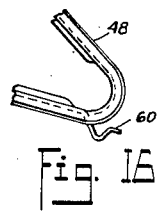

In the embodiment shown, the opening C is of generally circular configuration, thereby generally permitting swiveling movement of the clip on the panel P. Referring now to FIGS. 13 through 16, if such swiveling movement is a problem and/or is not desired, the body portion 48 of the clip can be provided with tabs or fingers of the types illustrated in FIGS. 13 to 16, which tabs are adapted to be received in a respective opening in the supporting panel in generally overlapped relation with the defining edge portion of such opening, such opening being disposed in predetermined spaced relation to the aforementioned clip fastening opening C therein. In addition, such tabs aid in the locating or positioning of the latching shank 50 with respect to the receiving hole C in the panel. FIGS. 13 and 14 show one (58) arrangement of the tab, disposed adjacent the reverse bend portion 15 of the clip, while FIG. 15 shows another embodiment 58' of such tab with such embodiment being generally a straight line or planar type tab, while FIG. 16 illustrates a further embodiment of the tab, which is of generally arcuate or bent configuration, for more positive gripping of the section of the supporting panel surrounding the opening in which the tab 60 is received.

To detach the clip from secured position on the panel, a pointed tool or rod may be inserted through the aforementioned opening 62 with the end of the rod engaging the inner surface of the shank 50, and then utilizing the edge of the opening 62 as a fulcrum, the shank may be pivoted or forced outwardly a sufficient amount to permit snapping of the tab 54 out of interlocking relation with the underside of the linear abutment 56, and thereby permitting release of the clip from the panel.

FIGS. 7 to 12 illustrate another embodiment of the invention. In this embodiment, the shank portion 64 is of split or bifurcated construction as at 65 defining shank finger sections 64a and 64b. The base section 66b of loop or body portion 66 is provided with a recessed portion 68 in a generally similar manner as that described in connection with the first described embodiment of the invention, and is also provided with a depending tongue portion 69 generally similar to that described in connection with the FIGS. 1 to 6 embodiment of the invention. Finger sections 64a and 64b are each provided with a generally upwardly or outwardly facing shoulder or abutment 70 on the outer edge thereof which is adapted for snap fastening relation with a confronting edge or shoulder abutment 72 of recessed portion 68 of the clip, when the latter is in assembled position on the panel P as shown in FIGS. 11 and 12 of the drawings. The finger portions 64a and 64b intermediate the ends thereof and the aforementioned shoulder or abutment portions 70 are tapered inwardly as at 74. These tapered surfaces are adapted for camming coaction with the aforementioned edges 72 of recessed portion 68 to force the finger sections 64a and 64b of the shank 64 inwardly toward one another during downward movement of the shank portion to accomplish assembly of the clip to the panel, such assembly being accomplished in a generally similar manner as that aforediscussed in connection with FIGS. 1 to 6 of the drawings. Thus the FIGS. 7 to 12 embodiment of the clip is held in secured position on the panel P by the depending tongue portion 69 engaging in overlapping relation defining portions of the opening C in the panel, to limit movement of the clip in one direction while the engagement of the depending shank portion 64 with defining surfaces of the opening C in the panel, limits movement of the clip in the opposite lengthwise direction, and the engagement of abutment or shoulder portions 70 of the finger sections 64a and 64b of the clip with the underside of the confronting edges 72 of recessed portion 68, clamps the yieldable loop portion 66 of the clip body about the wire Z to thus mount the latter securely on the panel. As shown, the opening C in the panel may be of generally circular configuration, and thus the FIG. 7 to 12 embodiment of the clip could be provided with a tongue portion at the reverse bend portion of the clip body and in a similar manner as that illustrated in FIGS. 13 to 16, and thus prevent swivelling of the clip on the panel. Disassembly of the FIGS. 7 to 12 embodiment of the clip from the panel can be readily accomplished by pinching or forcing together finger sections 64a and 64b, thereby snapping abutment portions 70 thereon out of overlapped holding relation with edge portions 72 of recess section 68 of the clip, whereupon the shank portion would spring out of projecting position through opening C in the panel.

From the foregoing description and accompanying drawings it will be seen that the invention provides a clip arrangement in the form of a contractable body for quickly and easily fastening a cable, conduit, tube or other object onto an apertured panel by a snap-fastening operation, and one that can be just as readily detached from the panel, if the latter is deemed necessary or desirable.

The terms and expressions which have been employed are used as terms of description and not of limitation and there is no intention in the use of such terms and expressions of excluding any equivalents of any of the features described or shown or portions thereof, but it is recognized that various modifications are possible within the scope of the invention claimed.

I claim:

1. A clip for mounting an article, such as a cable or the like, on an apertured support, said clip comprising a strip of material having spring-like characteristics and bent into the form of a generally elongated contractible loop adapted to receive in transversely extending relation the article therethrough and to hold the same in secured relation, one side of said loop forming a generally planar base section adapted for abutting engagement with the support and the other side of said loop forming a lever section, and including a depending shank adjacent the free forward end of the lever section extending inwardly toward said base section, said base section having a greater transverse dimension than the transverse dimension of said shank, and said base section at its free forward end having an opening therethrough opening onto the free end of the said base section and disposed intermediate the side boundaries of said base section, said shank being disposed above said opening with said shank being movable through said opening upon predetermined contraction of said loop, abutment means on said base section at said opening and abutment means on said shank adapted for snap fastening interlocking relation when said loop is contracted a predetermined amount, to selectively hold the loop in closed contracted condition about the article, the free end of said shank being adapted to be received through the aperture in the support when the clip is in mounted relation on the support to restrict lengthwise movement of the clip with respect to the support, and an oblique rearwardly extending tongue depending from said base section, said tongue being disposed rearwardly of the free end of said shank a predetermined amount and being adapted for overlapping relation with the peripheral underside of the aperture in the support for coaction with said shank in maintaining said clip in mounted relation on the support.

2. A clip in accordance with claim 1 wherein the free end of said shank is of arcuate configuration to facilitate movement of said shank through the aperture in the support.

3. A clip in accordance with claim 1 including means on said shank and on said lever section for facilitating disengagement of said abutment means to permit ready release of said clip from the support.

4. A clip for mounting a cable or the like on an apertured support, said clip comprising a strip of sheet metal having spring like characteristics and bent to form a generally open-ended elongated contractable band adapted to receive the cable therethrough in transversely extending relation and to mount the same on the support, one side of said band forming a generally planar base section adapted to be positioned in juxtaposed relation against a confronting surface of the support and the other side of said band forming a lever section, said lever section at its free forward end having a depending shank portion extending partially across the open end of said band and toward said base section, said base section adjacent its forward free end having an opening therethrough disposed intermediate the side boundaries of said base section and opening onto the free forward end of said base section, the innermost end of said opening defining a transversely extending abutment, said shank portion comprising rearwardly facing abutment means thereon adapted for interlocking coaction with said abutment on said base section to hold said loop in predetermined contracted condition, the free end of said shank portion being adapted to be received through the aperture in the support when the clip is in mounted relation on the support to restrict linear movement of the clip with respect to the support, and means including a diagonally rearwardly depending tongue portion on said base section disposed a predetermined amount rearwardly of the free end of said shank portion and adapted to be received in an aperture in the support for coacting with said shank portion in retaining the clip in mounted position on the support.

5. A clip for mounting a cable or the like on an apertured support, said clip comprising a strip of sheet metal having spring like characteristics and bent to form a generally open-ended contractable band, one side of said band forming a base section adapted for mounting on a confronting surface of the support and the other side of said band forming a lever section, said lever section at its forward end having a depending shank portion extending towards the said base section, said base section comprising a recessed portion adjacent the forward free end thereof, said recessed portion opening onto the free end of said base section, said shank portion being bifurcated lengthwise thereof and including generally upwardly facing abutment means on its outer edges, said shank portion being adapted to be received through said recessed portion on said base section upon movement of said lever section toward said base section whereby interlocking snap-fastening engagement occurs between said abutment means on said shank portion and confronting side edges of said recessed portion to hold said band in pre-determined contracted condition and in clamped relation relative to the object being mounted, said shank portion being adapted to be received through the aperture in the support when the clip is in mounted relation on the support to restrict lengthwise movement of the clip with respect to the support, and diagonally rearwardly extending means on said base section depending therefrom rearwardly of said shank portion and adapted for overlapping holding engagement with a peripheral edge portion of an aperture in the support for retaining the clip on the support.

6. A clip in accordance with claim 5, wherein the outer edges of said bifurcated shank portion are tapered downwardly and in converging relationship with respect to one another intermediate the free end of said shank portion and said abutment means, and are adapted for camming relation with said side edges of said recessed portion on said base section upon movement of said lever section toward said base section and resultant passage of said shank portion through said recessed portion.

7. In a fastening assembly comprising a support, such as a panel, said support having a circular-like aperture therethrough, a clip mounted on the support over said aperture, said clip comprising a strip of metal having spring-like characteristics and bent into the form of a generally elongated contractable loop, an elongated article, such as a cable, received in transversely extending relation through said loop and being held by the latter in secured relation on said support, one side of said loop forming a generally planar base section engaging in abutting relation said support and the other side of said loop forming a lever section, said lever section adjacent its free forward end having a depending shank extending inwardly toward said base section, said base section having a greater transverse dimension than the transverse dimension of said shank, said base section adjacent its free forward end having an opening therethrough opening onto the free end of said base section and disposed intermediate the side boundaries of said base section, said opening defining linear abutment means on said base section, said shank having abutment means thereon disposed intermediate the ends of said shank, the free end of said shank being moved through said opening and through said aperture upon predetermined contraction of said loop whereupon snap fastening interlocking coaction occurs between said abutment means on said base section and said abutment means on said shank to hold said loop in clamped relation relative to said article, said shank in said aperture in said support being adapted for engagement with the defining periphery of said aperture to restrict linear movement of the clip with respect to the support, a diagonally rearwardly extending tongue depending from said base section and located a predetermined amount rearwardly of said shank, said tongue being received through said aperture in overlapping holding coaction with a peripheral edge portion thereof on the underside of said support to prevent movement of said clip outwardly from said support, said tongue coacting with said shank in said aperture to restrict lengthwise and linear transverse movement of said clip on said support.

References Cited in the file of this patent

UNITED STATES PATENTS

| | | |
|---|---|---|
| 2,342,958 | Morehouse | Feb. 29, 1944 |
| 2,531,911 | Johnson | Nov. 28, 1950 |
| 2,618,033 | Tinnerman | Nov. 18, 1952 |

FOREIGN PATENTS

| | | |
|---|---|---|
| 686,971 | Great Britain | Feb. 4, 1953 |
| 713,575 | Great Britain | Aug. 11, 1954 |